US005579971A

United States Patent [19]
Chuang

[11] Patent Number: 5,579,971
[45] Date of Patent: Dec. 3, 1996

[54] ARTICLE CARRIER FOR BICYCLE

[76] Inventor: Louis Chuang, No. 11th Floor -1, No. 367, Gong Yi Road, Taichung, Taiwan

[21] Appl. No.: 384,740

[22] Filed: Feb. 7, 1995

[51] Int. Cl.[6] ..................................................... B62J 9/00
[52] U.S. Cl. ........................ 224/430; 224/445; 224/447; 224/555
[58] Field of Search ..................................... 224/39, 32 A, 224/42, 547, 555, 560, 430, 445, 447, 450

[56] References Cited

U.S. PATENT DOCUMENTS

| | | | |
|---|---|---|---|
| 4,353,490 | 10/1982 | Jackson et al. | 224/39 |
| 4,516,705 | 5/1985 | Jackson | 224/32 A |
| 4,562,944 | 1/1986 | Jackson et al. | 224/39 |
| 4,671,438 | 6/1987 | La Plante | 224/32 A |
| 5,435,471 | 7/1995 | Chuang | 224/39 |

*Primary Examiner*—Renee S. Luebke
*Attorney, Agent, or Firm*—Charles E. Baxley, Esq.

[57] ABSTRACT

A carrier attaches an article to a support rack of a bicycle without additional tools. The carrier includes a beam fixed to the article and having a dove-tail, two hooks having, dove-tail slots for slidably engaging with the dove-tail of the beam and for hooking to the support rack. A retainer is slidably engaged on the beam and includes a catch pivotally coupled to the upper portion for engaging with the support rack. The beam can he solidly secured to the support rack without additional tools.

8 Claims, 6 Drawing Sheets

ARTICLE CARRIER FOR BICYCLE

BACKGROUND OF THE INVENTION

1. Field of the Invention

The present invention relates to a carrier, and more particularly to an article carrier for bicycles.

2. Description of the Prior Art

Typical article carriers for bicycles comprise a bag including a number of bars or beams secured thereto. The bars or beams are required to be secured to the article support rack by a number of screws and nuts which are required to be fixed in place by screw drivers or other tools; such that the article carriers may not be easily secured to the article supporter rack and may not be easily disengaged from the article support rack.

The present invention has arisen to mitigate and/or obviate the afore-described disadvantages of the conventional article carriers for bicycles.

SUMMARY OF THE INVENTION

The primary objective of the present invention is to provide an article carrier for bicycles in which the article carrier may be easily engaged on and disengaged from the article support rack.

In accordance with one aspect of the invention, there is provided a carrier for attaching an article to a support rack of a bicycle, the carrier comprising a beam for fixing to the article, the beam including a first dove-tail means, at least one hook means secured to the beam for hooking to the support rack, the hook means including a second dove-tail means for slidably engaging with the first dove-tail means, means for securing the first hook means to the beam, and a retaining means secured to the beam for engaging with the support rack so as to retain the beam on the support rack, the retaining means including a body having a third dove-tail means for slidably engaging with the first dove-tail means, means for securing the body to the beam, a catch means pivotally coupled to the body, and means for biasing the catch means to engage with the support rack. Whereby, the beam is solidly secured to the support rack by the hook means and the catch means.

A bar is further provided for fixing to the article and arranged horizontally, the bar includes a slot formed therein, a post, is disposed vertically and includes a groove formed therein, the post includes an engaging means for engaging the post to the support rack, and fastening means slidably engage in the slot and the groove for adjusting relative position of the bar and the post and for securing the post to the bar. The engaging means includes an arc secured to the post for engaging with the support rack. A shaft is secured to the support rack and includes an annular ring or an annular recess or engaging with the arc.

The engaging means may also include a projection formed in the bottom portion of the post for engaging with the support rack.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
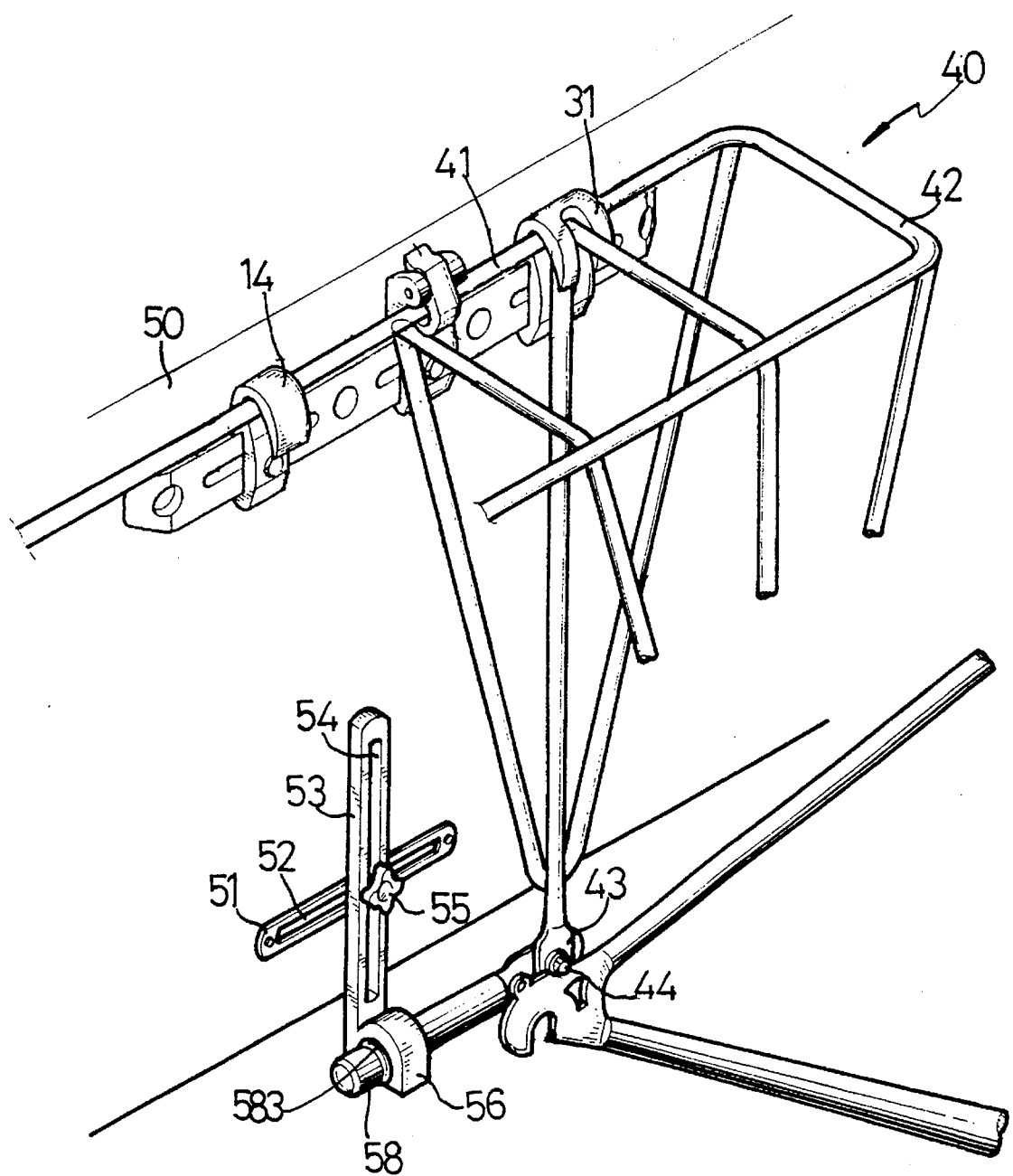
FIG. 1 is a perspective view of an article carrier for a bicycle in accordance with the present invention.
Figure 3:
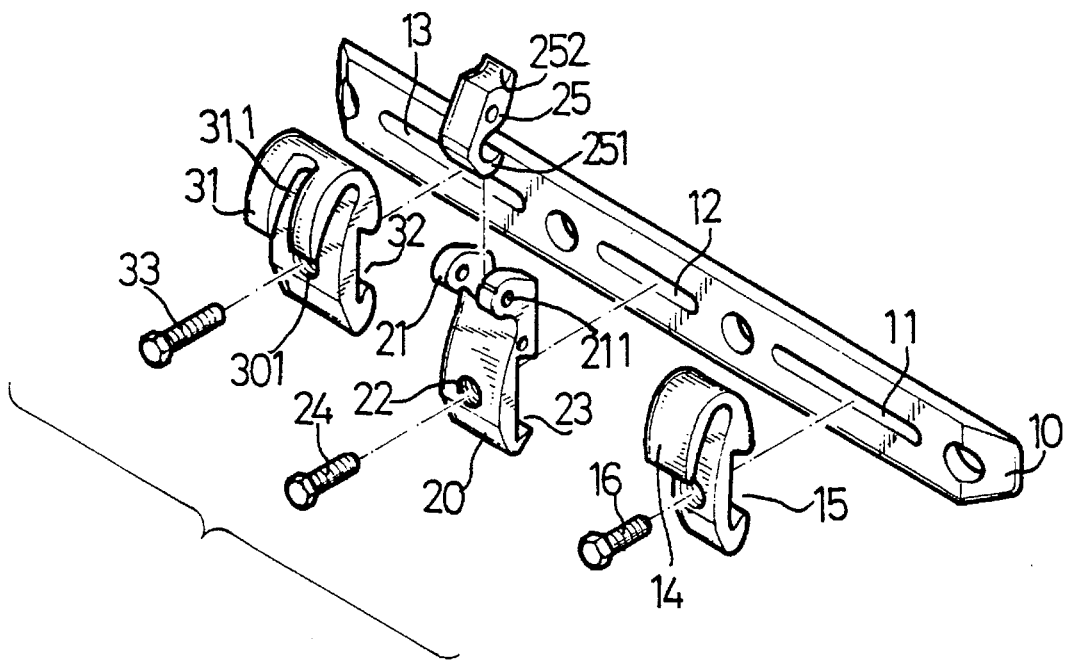
FIG. 3 is a partial exploded view of the article carrier.
Figure 2:
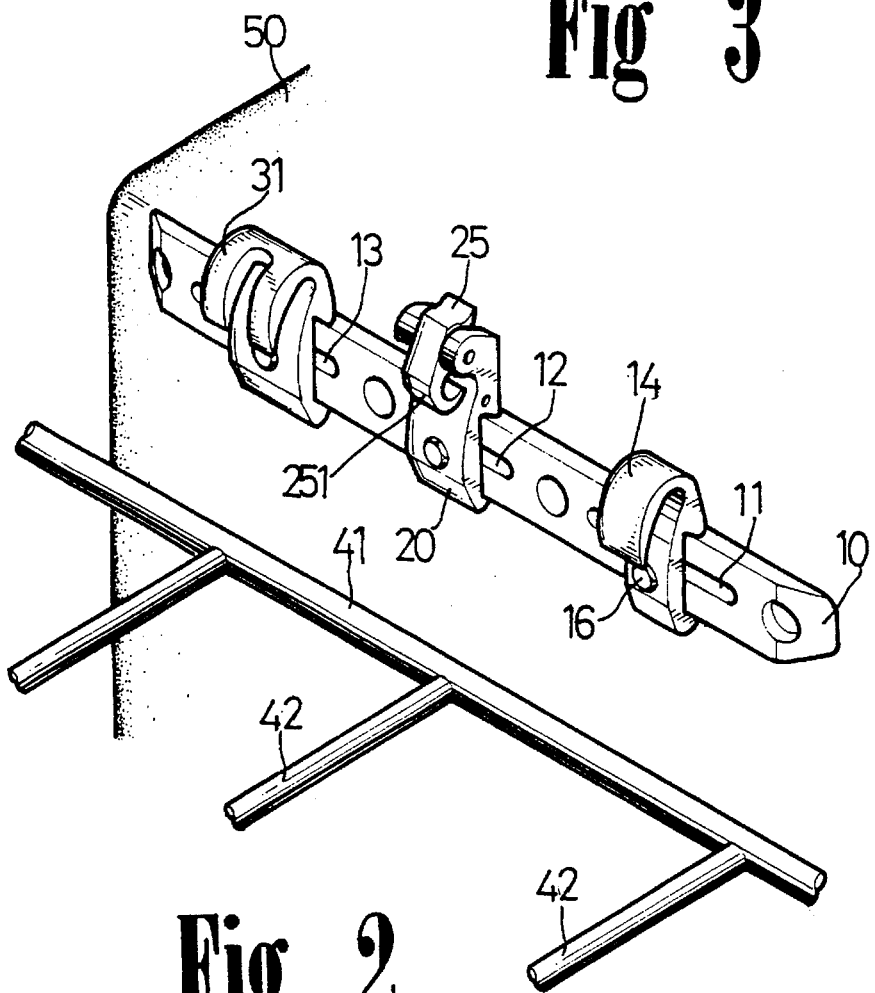
FIG. 2 is a partial perspective view showing the application of the article carrier.
Figure 4:
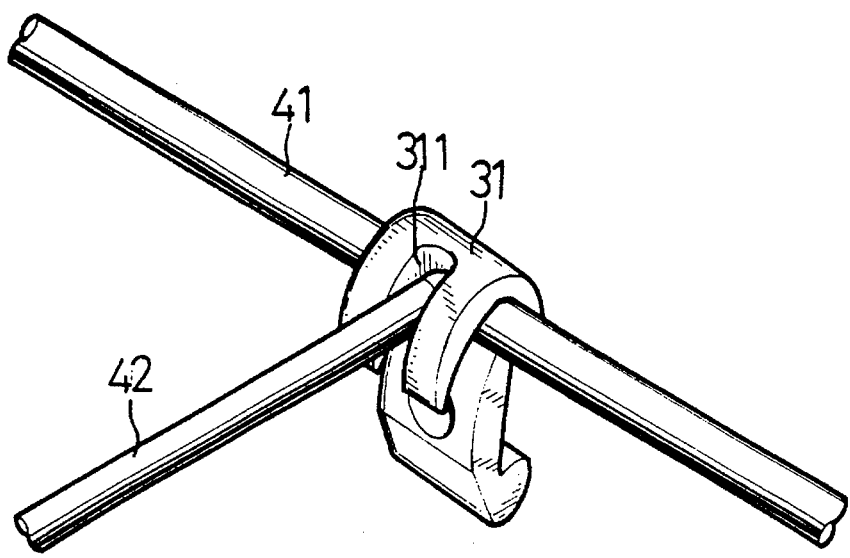
FIG. 4 is a partial perspective view showing a portion of the article carrier.
Figure 5:
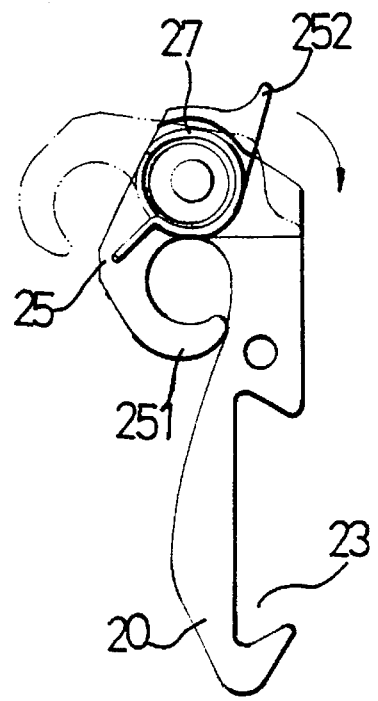
FIGS. 5 and 6 are schematic views illustrating the operation of a hook means and an adjusting means of the article carrier.

Referring to the drawings, and initially to FIGS. 1 to 5, an article carrier in accordance with the present invention is provided for attaching an article to an article support rack 40 of a bicycle and comprises a beam 10 fixed to the article, such as a pannier 50. The beam includes a dove-tail shaped cross section. Three oblong holes 11, 12, 13 are formed in the beam 10. Two hooks 14, 31 each include a dove-tail shaped recess 15, 32 formed in the rear portion thereof for slidably engaging with ,the beam 10. Two bolts 16, 33 are engaged through the hooks 14, 31 and engaged through the oblong holes 11, 13 for fixing the hooks 14, 31 to the beam 10. The hooks 14, 31 may be hooked to rods 41 of the article support rack of the bicycle including rear rack 40, top tube of the bicycle frame, or the handlebar of the bicycle. The bolts 16, 33 may be adjusted along the oblong holes 11, 13 for adjusting the positions of the hooks 14, 31 on the beam 10 so as to adjust the hooks 14, 31 to suitable positions. The hook 31 includes a hole 301 for engaging with the bolt 33 and includes a notch 311 for engaging with stick 42 of the article support rack 40 such that the hook 31 and the beam 10 may be prevented from moving along the rod 41 when the hook 31 is fixed to the beam 10.

The article carrier further includes a retaining means 20 for further securing the beam 10 to the bicycle. The retaining means 20 includes a body having a dove-tail shaped recess 23 for slidably engaging with the beam 10 and having a hole 22 for engaging with a bolt 24 and nut which may secure the body 20 to the beam 10. The body 20 includes a pair of lugs 21 each having a hole 211 formed therein for engaging with a pivot pin. A catch 25 is pivotally coupled to the pivot pin and engaged between the lugs 21 and includes another hook 251 rotatable about the pivot pin for engaging with the rod 41 and includes a knob 252 for rotating the catch 25. A spring 27 (FIG. 5) is engaged in the catch 25 for biasing the catch 25 to engage with the rod 41. When the catch 25 is engaged with the rod 41 of the back rack 40, the beam 10 is prevented from disengaging from the back rack 40, such that the beam 10 can be solidly secured to the back rack 40 and will not be easily disengaged from the back rack 40.

Figure 6:
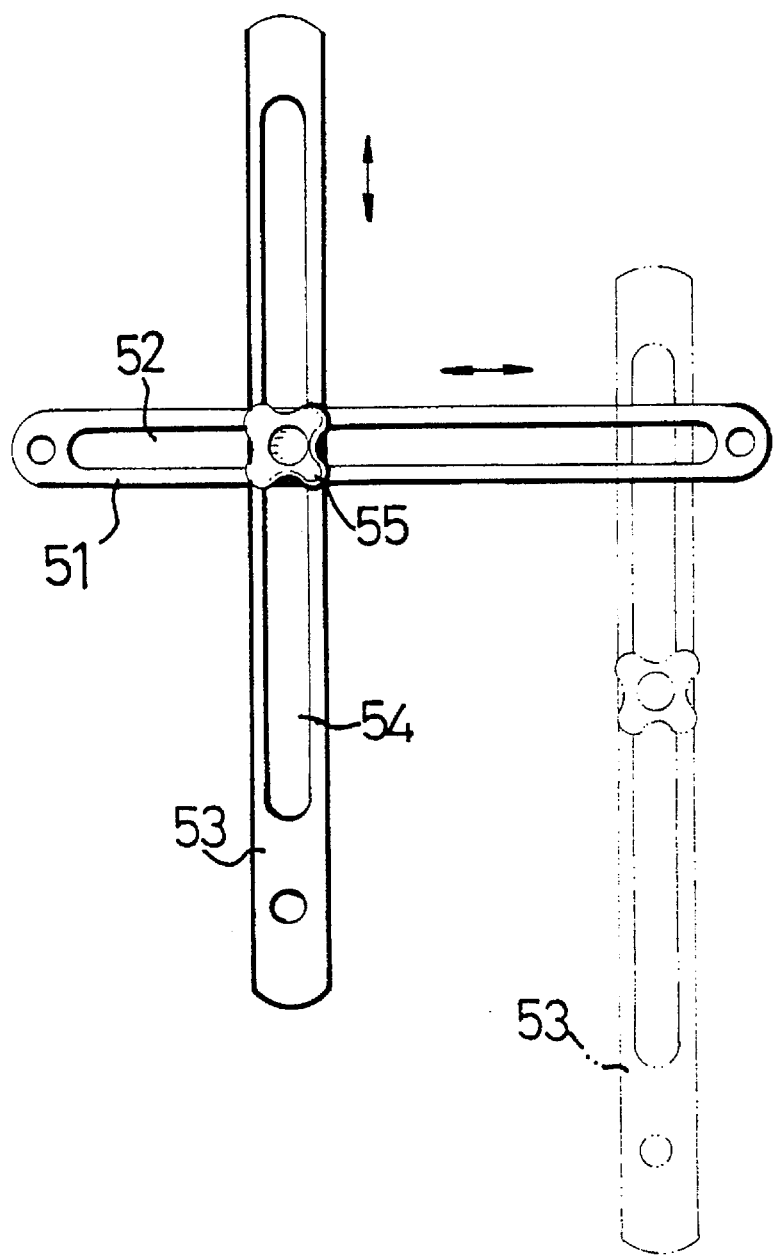
Figure 7:
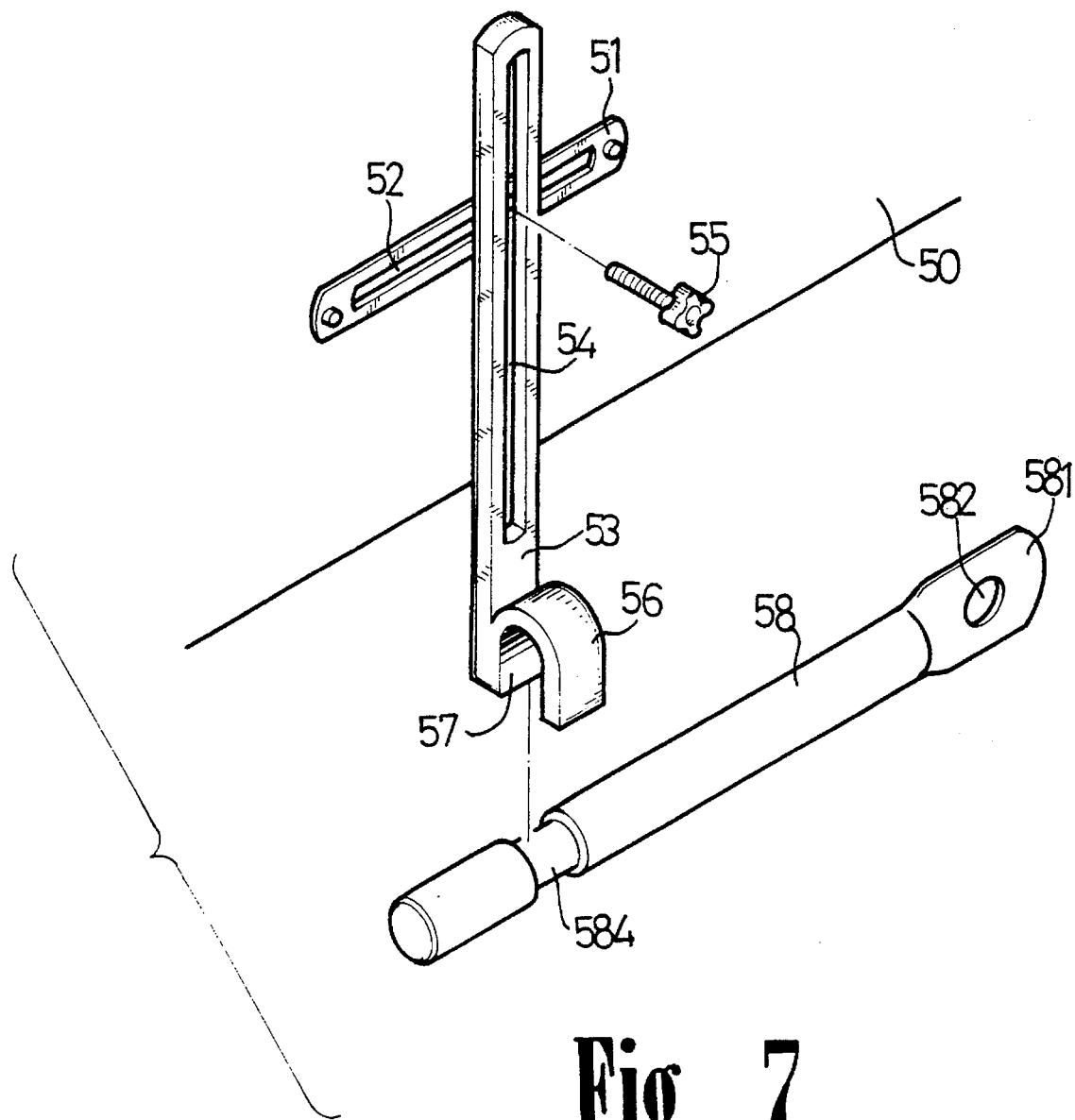
FIGS. 7 and 8 are partial exploded views showing two applications of the adjusting means.

Referring next to FIGS. 6 and 7, and again to FIG. 1, a shaft 58 includes one end 581 having a hole 582 formed therein for engaging with a bolt 44 which secures the shaft 58 to the bottom of a pole 43 of the article support rack 40. The shaft 58 includes either an annular ring 583 (FIG. 9) or an annular recess 584 (FIG. 7) formed therein. A bar 51 is horizontally fixed to the lower portion of the bag 50 and includes a slot 52 formed therein. A post 53 is arranged vertically beside the bar 51 and includes a groove 54 formed therein, and includes an arc 56 having an opening 57 formed therein for engaging with the annular ring 583 or the annular recess 584. A bolt 55 is engaged through the groove 54 and the slot 52 and is adjustable along the slot 52 and the groove 54. The bolt 55 may be engaged with a nut so as to secure the post 53 to the bar 51 such that the article 50 may further be secured to the support rack 40.

Figure 8:
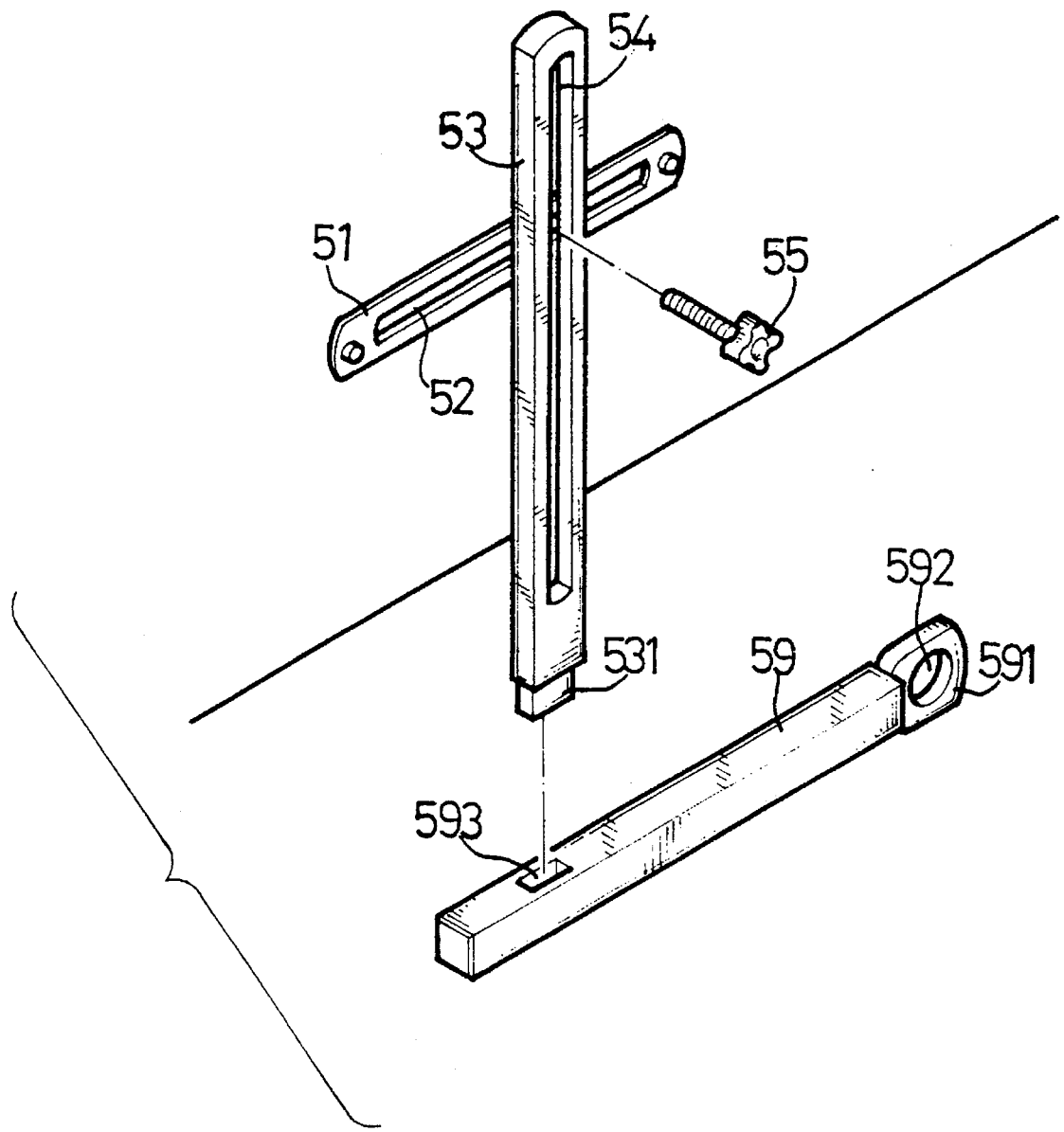

Alternatively, as shown in FIG. 8, a projection 531 is formed in the bottom of the post 53 for engaging with a cavity 593 of a shaft 59 which includes a hole 592 formed in one end 591 for securing to the pole 43 of the article support rack 40.

It is to be noted that the arc 56 and the projection 531 may directly engage with the support rack 40 or engage with the chain stay of the bicycle instead of engaging on the shaft 58.

Accordingly, the article carrier may be solidly secured to the back rack, top tube or handle bar of a bicycle, and may be easily disengaged from the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrier for attaching an article to a support rack of a bicycle, said carrier comprising:
   a beam for fixing to said article, said beam including a first dove-tail member,
   at least one hook means secured to said beam for hooking to said support rack, said hook means including a second dove-tail member for slidably engaging with said first dove-tail member,
   means for securing said first hook means to said beam, and
   a retaining means secured to said beam for engaging with said support rack so as to retain said beam on said support rack, said retaining means including a body having a third dove-tail member for slidably engaging with said first dove-tail member, means for securing said body to said beam, a catch means pivotally coupled to said body, and means for biasing said catch means to engage with said support rack,
   whereby, said beam is solidly secured to said support rack by said hook means and said catch means.

2. An article carrier according to claim 1 further comprising a bar for fixing to said article and arranged horizontally, said bar including a slot formed therein, a post disposed vertically and including a groove formed therein, said post including an engaging means for engaging said post to the bicycle, and fastening means slidably engaged in said slot and said groove for adjusting relative position of said bar and said post and for securing said post to said bar.

3. An article carrier according to claim 2, wherein said engaging means includes an arc secured to said post for engaging with bicycle.

4. An article carrier according to claim 3 further comprising a shaft for securing to said support rack, said shaft including an annular ring for engaging with said arc.

5. An article carrier according to claim 3 further comprising a shaft for securing to said support rack, said shaft including an annular recess for engaging with said arc.

6. An article carrier according to claim 2, wherein said engaging means includes a projection formed in said post for engaging with the bicycle.

7. An article carrier according to claim 6 further comprising a shaft for securing to said support rack, said shaft including a cavity formed therein for engaging with said projection.

8. A carrier for attaching an article to a support rack of a bicycle, said support rack including at least one rod and at least one stick intersected with each other, said carrier comprising:
   a beam for fixing to said article, said beam including a first dove-tail member,
   at least one hook means secured to said beam for hooking to said rod of said support rack, said hook means including a second dove-tail member for slidably engaging with said first dove-tail member, said hook means including a notch formed therein for engaging with said stick so as to prevent said hook means from moving along said rod,
   means for securing said first hook means to said beam, and
   a retaining means secured to said beam for engaging with said support rack so as to retain said beam on said support rack, said retaining means including a body having a third dove-tail member for slidably engaging with said first dove-tail member, means for securing said body to said beam, a catch means pivotally coupled to said body, and means for biasing said catch means to engage with said support rack,
   whereby, said beam is solidly secured to said support rack by said hook means and said catch means.

* * * * *